US005793425A

United States Patent [19]
Balakrishnan

[11] Patent Number: 5,793,425
[45] Date of Patent: Aug. 11, 1998

[54] METHOD AND APPARATUS FOR DYNAMICALLY CONTROLLING ENCODING PARAMETERS OF MULTIPLE ENCODERS IN A MULTIPLEXED SYSTEM

[75] Inventor: Mahesh Balakrishnan, Briarcliff Manor, N.Y.

[73] Assignee: Philips Electronics North America Corporation, New York, N.Y.

[21] Appl. No.: 713,311

[22] Filed: Sep. 13, 1996

[51] Int. Cl.$^6$ ............................................. H04N 7/08
[52] U.S. Cl. ..................... 348/387; 370/468; 370/537
[58] Field of Search ............................. 348/385, 387; 370/468, 477, 537; H04N 7/08

[56] References Cited

U.S. PATENT DOCUMENTS

| | | | |
|---|---|---|---|
| 5,115,309 | 5/1992 | Hang | 348/388 |
| 5,566,208 | 10/1996 | Balakrishnan | 348/419 |
| 5,600,365 | 2/1997 | Kondo | 348/8 |
| 5,606,369 | 2/1997 | Keesmam | 348/385 |
| 5,621,463 | 4/1997 | Lyons | 348/347 |
| 5,625,416 | 4/1997 | Tseng | 348/388 |
| 5,627,825 | 5/1997 | Barraclough | 370/260 |

FOREIGN PATENT DOCUMENTS

| | | | |
|---|---|---|---|
| 0550843A1 | 7/1993 | European Pat. Off. | H04N 7/137 |
| WO9529559 | 11/1995 | WIPO | H04N 7/12 |

OTHER PUBLICATIONS

"Statistical Multiplexing of Multiple MPEG-2 Video Programs in a Single Channel", M. Perkins et al, SMPTE Journal, Sep. 1995, pp. 596–599.

"Multichannel Joint Rate Control of VBR MPEG Encoded Video For DBS Applications" A. Guha et al, IEEE Translations on Consumer Electronics, vol. 40, No. 3, Aug. 1994, pp. 616–623.

*Primary Examiner*—Howard W. Britton
*Attorney, Agent, or Firm*—Laurie E. Gathman

[57] ABSTRACT

A method and apparatus for dynamically allocating the available bandwidth of a common transmission channel of a multiplexed system among multiple encoders in such a manner as to maximize and equalize the quality of the encoded data output by all of the encoders, while also preventing underflow or overflow of encoder or decoder buffers at each end of the common transmission channel, and moreover, while also ensuring compliance with (i.e., without violating) the data encoding and transmission protocol utilized by the system. Further, the bandwidth of the common transmission channel is preferably allocated using an algorithm that does not impose any constraints on the size of the encoder or decoder buffers, other than any constraints specified by the data transmission protocol employed in transmitting the encoded data over the common transmission channel. In a presently preferred embodiment, in which video signals from multiple sources are encoded, both the output channel rate ("bit rate") of each of the encoders and the target number of bits for each picture that is encoded by each encoder are controlled by a controller in accordance with a control algorithm which ensures that the quality of the encoded pictures output by all of the encoders is equalized and maximized, that no underflow or overflow of the encoder or decoder buffers occurs, and that the data encoding and transmission protocol utilized by the system is not violated. Further, the control algorithm employed by the controller preferably does not impose any constraints on the sizes or relative sizes of the encoder or decoder buffers. Moreover, the control algorithm employed by the controller preferably maintains all of the encoder buffers as empty as possible in order to provide increased flexibility to the rate allocation procedure.

41 Claims, 2 Drawing Sheets

METHOD AND APPARATUS FOR DYNAMICALLY CONTROLLING ENCODING PARAMETERS OF MULTIPLE ENCODERS IN A MULTIPLEXED SYSTEM

BACKGROUND OF THE INVENTION

The present invention relates generally to data encoding and transmission systems in which data from multiple channels are multiplexed into a single data stream, and, more particularly, to a system of this type in which encoding parameters of the encoders for the respective multiple channels are dynamically controlled by a controller. A generally related invention by the present inventor is disclosed in co-pending U.S. Pat. Application Ser. No. 08/214,910, filed Mar. 17, 1994, and entitled "AN ENCODER BUFFER HAVING AN EFFECTIVE SIZE WHICH VARIES AUTOMATICALLY WITH BIT RATE" now U.S. Pat. No. 5,566,208. The disclosure of this application, which is also assigned to the assignee of the present invention, is herein incorporated by reference.

In multiplexed data transmission systems, data from a plurality of different data sources, or data channels, are combined or multiplexed, at a head end station, into a single data stream for transmission over a transmission link, such as a wire, fiber optic or radio link, to a back end station, where the channels of data from the multiplexed data stream are then separated, or demultiplexed, and supplied to intended recipients.

In an exemplary system of particular interest herein, a plurality of video signals from different video sources, such as different television network feeds, different television stations, or other video sources, are transmitted over a satellite link for direct broadcast to respective television receivers ("set-top boxes") located in the homes of individual consumers. An exemplary satellite link includes a digital transmission path capable of transmitting 24 megabits per second (Mbps). In order to maximize the data transmission efficiency and utilization of such a link (i.e., in order to maximize utilization of the available bandwidth), it is necessary for several video signals (e.g., six video signal channels) to share the link (i.e., to be transmitted as a single, multiplexed data/bit stream).

In a typical multiplexed video signal transmission system, the video signals from the different sources are encoded by respective parallel variable bit rate (VBR) video encoders as successive fields or frames ("pictures"), and the encoded video signals output by the video encoders are combined into a single digital video bit stream for transmission over a common channel (e.g., the direct broadcast satellite (DBS) link) by a multiplexer. In general, the number of bits required to encode a picture of a given quality increases in accordance with the spatial and temporal complexity of the picture. Thus, pictures corresponding to spatially complex scenes and/or scenes with motion require more bits to encode them than do pictures corresponding to spatially simple scenes with little motion. In this regard, the quality of pictures of different complexity can be equalized by coding the pictures using a number of bits which is functionally related to the complexity of the picture.

It is generally assumed that, statistically, the average combined bit rate from all of the parallel video encoders will be less than the maximum bit rate of the common transmission channel allowed by the transmission protocol, even though at any given time a single video encoder (for a single channel of video signals) may provide a large number of bits in a burst for transmission. For this reason, such apparatus is commonly referred to as a "statistical multiplexer".

However, there is a finite probability that the instantaneous combined bit rate from all of the channels (i.e., the combined bit rate of the encoded video signals output by the parallel video encoders) will exceed the maximum allowable bit rate of the common transmission channel, thereby resulting in a loss of data (picture information) at the back end station (e.g., consumer television set). In order to minimize such occurrences, encoder and decoder buffers are utilized. In this regard, most video coding standards (e.g., MPEG) specify the decoder buffer size. However, there still exists a finite probability that the encoder and/or decoder buffers will overflow (or underflow), again resulting in loss of data at the back end station.

In general, a significant goal of system designers is to reduce the required size of the decoder buffers (without unduly compromising picture quality), since decoder buffers are an important component of the cost of the consumer set-top boxes. On the other hand, the size of the encoder buffers is generally not a major constraint in the design of the system, since the cost of the encoder buffers is a relatively insignificant component of the overall cost of the head end station.

Various systems have been proposed in order to maximize the utilization of the bandwidth of the common transmission channel while maintaining acceptable picture quality and ensuring compliance with a digital video data encoding, transmission, and decoding protocol (e.g., an MPEG protocol). Several of these proposed systems are discussed below by way of background.

European Patent Application No. 92121030.8, published on Dec. 10, 1992, in the name of Paik et al., discloses a statistical multiplexer which uses a common global control parameter that determines the quality of the encoded pictures output by each of the video encoders. However, Paik et al. do not provide a solution for allocating bit rate among the video encoders. Therefore, since the complexity of the pictures from each video source are not taken into consideration, the quality of the encoded pictures output by the different video encoders can vary widely, e.g., from poor quality to excellent quality, depending upon the complexity of the picture.

U.S. Pat. No. 5,115,309, issued on May 1992 to Hang, discloses a method and apparatus for dynamic channel bandwidth allocation among multiple parallel video coders for coding a single picture. However, the method and apparatus disclosed by Hang is not applicable to parallel coding multiple pictures.

An article entitled "Multichannel Joint Rate Control of VBR MPEG Encoded Video for DBS Applications", *IEEE Transactions on Consumer Electronics*, Aug. 1994, by Guha and Reininger, discloses a multiplexed system in which large video encoder buffers are employed. The encoded picture bitstream produced by each video encoder is stored in its associated large encoder buffer, and the required average channel rate for transmitting the same is calculated. If the required average channel rate exceeds a prescribed maximum channel rate, the video data is re-coded in such a manner as to reduce the average channel rate by an appropriate amount.

An article entitled "Statistical Multiplexing of Multiple MPEG-2 Video Programs in a Single Channel", SMPTE Journal, Sep. 1995, by Perkins and Arnstein, discloses a multiplexed system that dynamically allocates bit rates to the different channels (i.e., different parallel video encoders) based on the complexity of the pictures currently being transmitted for all of the channels. However, the disclosed system requires that each video encoder buffer be smaller than its corresponding video decoder buffer by a factor that is equal to the ratio of the maximum and minimum channel rates of the encoder. This presents an undesirable trade-off between the required decoder buffer size and the quality of the encoded pictures. More particularly, the quality of the picture coded by an encoder buffer is related to the size of the buffer. Since the encoder buffer must be smaller than its corresponding decoder buffer in accordance with the above-stated constraint, then reducing the required size of the decoder buffer results also results in a reduction in the size of the encoder buffer, thereby resulting in degraded picture quality.

In this connection, as previously mentioned, most video coding standards (e.g., MPEG) specify the minimum decoder buffer size. For an MPEG-2 MP@ML system, the video decoder buffer size is specified to be 1,835,008 bits. If the encoder operates at bit rates ranging from 1.5 Mbps–15 Mbps, the size of the encoder buffer according the above-stated buffer size constraint must be 183,500 bits. If the range of bit rates is 1.5 Mbps–6 Mbps, the encoder buffer size must be more than 458,752 bits In either case, the video quality is significantly compromised. In the second case, the maximum operational rate is also reduced.

PCT Application Number WO 95/29559, published on Nov. 2, 1995, in the name of Ozkan et al., also discloses a multiplexed system that dynamically allocates bit rates to the different channels (i.e., different parallel video encoders) based on the complexity of the pictures currently being transmitted for all of the channels. The complexity of the pictures currently being transmitted for all of the channels are evaluated, and a proportion of the total bit rate of the transmission link is allocated to each channel corresponding in some manner to the relationship of the complexity of the current picture of that channel to the overall complexity of the pictures of all of the channels, such that, during any time period, the quality of the coded pictures of all of the channels is approximately the same. Thus, a channel transmitting a high complexity picture for a period of time will be dynamically allocated a higher bit rate during that period of time, but when the complexity of the picture becomes lower, the bit rate allocated to that channel will be reduced, and then re-allocated to other channels which are transmitting higher complexity images.

The Ozkan et al. multiplexer system suffers from the same drawbacks discussed above in connection with the Perkins and Arnstein system regarding the required trade-off between picture quality and decoder buffer size. In this regard, it is believed that the required size of the decoder buffers in the Ozkan et al. multiplexer system for pictures of acceptable quality is so large as to render the decoder buffers cost-prohibitive for consumer and other applications, and, in fact, so large as to possibly not comply with MPEG decoder buffer size requirements.

Moreover, the Ozkan et al. multiplexer system unnecessarily limits the maximum bit rate change which can be made between successive coding periods. This constraint results in an inability of the system to dramatically change the allocated bit rate in response to dramatic scene changes, which in turn results in poor picture quality for pictures corresponding to dramatic scene changes.

Based on the above and foregoing, it can be appreciated that there presently exists a need in the art for a method and apparatus for dynamically controlling encoding parameters of multiple encoders in a multiplexed system which overcomes the above-discussed drawbacks and shortcomings of the presently available technology. The present invention fulfills this need in the art.

SUMMARY OF THE INVENTION

The present invention encompasses a method and apparatus for dynamically allocating the available bandwidth of a common transmission channel of a multiplexed system among multiple encoders in such a manner as to maximize and equalize the quality of the encoded data output by all of the encoders, while also preventing underflow or overflow of encoder or decoder buffers at each end of the common transmission channel, and moreover, while also ensuring compliance with (i.e., without violating) the data encoding and transmission protocol utilized by the system. Further, the bandwidth of the common transmission channel is preferably allocated using an algorithm that does not impose any constraints on the size of the encoder or decoder buffers, even if the size of the decoder buffer is specified by the data transmission protocol employed in transmitting the encoded data over the common transmission channel.

In a presently preferred embodiment of the present invention, in which video signals from multiple sources are encoded, both the output channel rate ("bit rate") of each of the encoders and the target number of bits for each picture that is encoded by each encoder are controlled by a controller in accordance with an algorithm which ensures that the quality of the encoded pictures output by all of the encoders is equalized and maximized, that no underflow or overflow of encoder or decoder buffers occurs, and that the data encoding and transmission protocol utilized by the system is not violated. Further, the algorithm employed by the controller preferably does not impose any constraints on the sizes or relative sizes of the encoder or decoder buffers. Moreover, the algorithm employed by the controller preferably maintains all of the encoder buffers as empty as possible in order to provide increased flexibility to the rate allocation procedure.

In one of its aspects, the present invention embraces a multiplexed data transmission system which includes a plurality of encoders each having a data input coupled to a respective one of a plurality of data signals, a control input, and an encoder output, a multiplexer having a plurality of multiplexer inputs coupled to respective ones of the encoder outputs, and a multiplexer output coupled to a transmitting end of a data transmission channel, and, a controller for producing control signals in accordance with a control algorithm, the control signals being coupled to the control input of respective ones of the encoders for dynamically controlling at least two encoding parameters of the encoders, a first one of the encoding parameters being an output bit rate of each of the encoders. The multiplexer operates to multiplex the encoder outputs and to output a single, multiplexed encoded data stream over the data transmission channel at a transmission channel bit rate which is less than or equal to a prescribed maximum transmission channel bit rate. The transmission channel bit rate is equal to the sum of the output bit rates of all of the encoders.

The second one of the encoding parameters is preferably a target number of bits used by each of the encoders to encode each of a plurality of prescribed blocks of data contained in respective ones of the data signals.

The control algorithm preferably ensures that the quality of encoded data represented by all of said encoder outputs is substantially equalized without violating a data encoding and transmission protocol utilized by the system, e.g., an MPEG protocol. The control algorithm preferably imposes no constraints on the allowable sizes or relative sizes of the encoder or decoder buffers located on either side of the data transmission channel. The control algorithm also preferably minimizes the number of bits contained by each of the encoder buffers. The control algorithm also preferably ensures that no underflow or overflow of either the encoder buffers or the decoder buffers occurs.

In a presently preferred embodiment of the present invention, the data signals are video signals from a plurality of different video sources, whereby the prescribed blocks of data comprise successive pictures contained in respective ones of the video signals. The target number of bits are dynamically allocated by the controller in accordance with the control algorithm in such a manner that all of the encoders are allocated a target number of bits proportional to a measure of complexity of a picture currently being encoded thereby. The control algorithm preferably imposes an additional constraint that an actual number of bits used by each of the encoders in encoding each of the pictures not be greater than a dynamically allocated maximum number of bits and not be less than a dynamically allocated minimum number of bits.

The controller preferably dynamically varies the output bit rate of each of the encoders simultaneously at prescribed bit rate change intervals, in accordance with the control algorithm, and dynamically varies the target number of bits used by each of the encoders on a picture-by-picture basis, in accordance with the control algorithm.

Each of the encoders preferably communicates to the controller the actual number of bits used thereby in encoding each picture encoded thereby, as well as a measure of complexity of each picture encoded thereby. In this regard, the controller most preferably dynamically varies the output bit rate of each of the encoders simultaneously every 1/F seconds, in accordance with the control algorithm, where F is a maximum frame rate of any of the video signals.

The present invention also embraces a method generally corresponding to the above-described apparatus of the present invention.

BRIEF DESCRIPTION OF THE DRAWINGS

These and other objects, features, and advantages of the present invention will become apparent from the following detailed description taken in conjunction with the accompanying drawings, in which.

DETAILED DESCRIPTION OF THE INVENTION

Although the present invention will be described below in terms of a presently preferred embodiment thereof, it should be clearly understood that the present invention is not limited, in its broadest sense, to this particular embodiment or implementation of the basic inventive concepts herein taught. For example, although the present invention is described herein in terms of a multiplexed system which processes video signals, it should be clearly understood that the basic inventive concepts disclosed herein are not limited to the processing of video signals, but rather, are equally applicable to the processing of any other type of data to be encoded and transmitted, and subsequently decoded, e.g., audio, text, voice, fax, and other forms and types of data.

Figure 1:
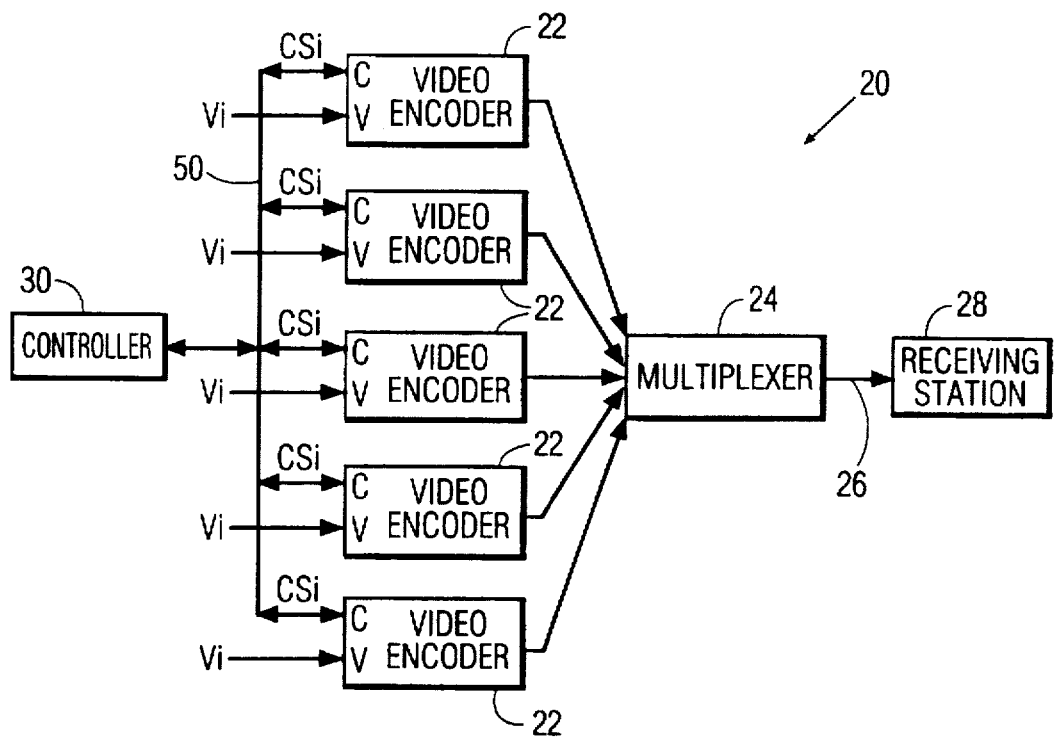
FIG. 1 is a block diagram of a multiplexed system constructed in accordance with a presently preferred embodiment of the present invention.

With reference now to FIG. 1, there can be seen a block diagram of a multiplexed system 20 constructed in accordance with a presently preferred embodiment of the present invention. As can be seen, video signals Vi from a plurality of different sources (e.g., different television stations and/or video feeds) are applied to the video input terminal V of respective, parallel video encoders 22, the respective channel outputs of which are combined by a multiplexer 24 into a single coded bit stream for transmission over a single transmission channel 26 (e.g., a DBS downlink) to a receiving station 28 (e.g., a set-top box in a home of an individual consumer). The receiving station 28 typically includes a demultiplexer for demultiplexing the bit stream in order to separate the bit stream into its constituent channels of encoded video data, which are then supplied to respective video decoders. As will be described more fully hereinafter, each of the video encoders and video decoders includes an associated buffer (see FIG. 2) for buffering the encoded and decoded video data, respectively. It is presently contemplated that the present invention will find particular utility in a DBS system in which the video signals from the different sources are encoded, transmitted, and decoded in accordance with the MPEG-2 T-STD and/or VBV models. Of course, this particular application is not limiting to the present invention.

In accordance with the present invention, the multiplexed system 20 includes a controller 30 (e.g., a microprocessor, microcontroller, or other suitable digital signal processing device) which is programmed to allocate the available bandwidth of the transmission channel 26 to the multiple video encoders 22 in accordance with a control algorithm which ensures that the quality of the encoded pictures output by all of the video encoders 22 is equalized and maximized, that no underflow or overflow of encoder or decoder buffers occurs, and that the data encoding and transmission protocol utilized by the system is not violated. In this regard, the channel output rates (i.e., bit rates) for each encoder 22 are chosen by the controller, in accordance with the control algorithm, in such a way as to ensure that each encoder 22 will be able to continue to operate without causing decoder or encoder buffer overflow, even if a failure of the controller 30 (or other system "failure mode") prevents the bit rates of the encoders 22 from being dynamically controlled. It will be appreciated by those skilled in the pertinent art that the bit rates of the encoders 22 can be effectively varied by either controlling the rate at which the encoders 22 "push" the encoded data to the multiplexer 24, or, by controlling the rate at which the multiplexer 24 "pulls" the encoded data from the encoders 22.

Further, the control algorithm employed by the controller 30 preferably does not impose any constraints on the sizes or relative sizes of the encoder or decoder buffers. Moreover, the control algorithm employed by the controller 30 preferably maintains all of the encoder buffers as empty as possible in order to provide increased flexibility to the rate allocation procedure, all as will become more fully apparent hereinafter.

More particularly, the controller 30 generates control signals CSi which are applied to the control signal input terminal C of respective ones of the parallel video encoders 22 for controlling both the channel output rate (i.e., "bit rate") of each respective encoder 22 and the target number of bits to be used by each respective encoder 22 in encoding each picture (e.g., field or frame of the input video signal Vi). It will be readily appreciated by those skilled in the pertinent art that the present invention separately controls two different encoding parameters of each of the video encoders (i.e., bit rate and target number of bits to be used in encoding each picture), rather than simply controlling just a single parameter (i.e., bit rate), as has been done heretofore. As will become more fully apparent hereinafter, this separate control of two different encoding parameters enables the above-stated goals of the present invention to be realized.

Figure 2:
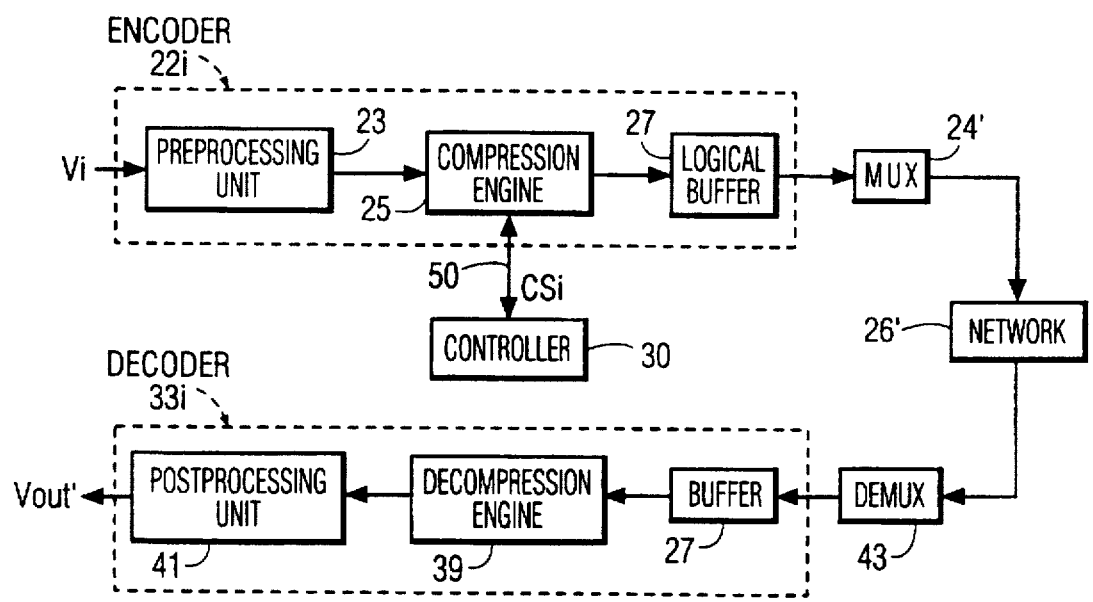
FIG. 2 is a block diagram of a simple model of an end-to-end system configuration that is used in the derivation of the control signals CSi that are generated by the controller of the multiplexer system of the presently preferred embodiment of the present invention.

With reference now to FIG. 2, there can be seen a block diagram of a simple model of an end-to-end system configuration that is used in the derivation of the control signals CSi that are issued by the controller 30 to an exemplary video encoder 22i. This model is used in order to enable implementation-specific details of the video encoder 22i and the controller 30 to be handled independently. As can be seen, the video encoder 22i on the transmitting end includes a preprocessing unit 23, a compression engine 25, and a logical buffer 27, and the video decoder 33i on the receiving end includes a buffer 37, a decompression engine 39, and a postprocessing unit 41. Further, the coded output of the video encoder 22i is applied to an input of a multiplexer 24', and the multiplexed coded bitstream which is transmitted over the transmission channel 26 is applied to an input of a demultiplexer 43 whose output is coupled to the input of the video decoder 33i.

The input video signal Vi applied to the preprocessing unit 23 and the output video signal Vout' from the postprocessing unit 41 are either interlaced or progressive, and are both produced at a suitable frame rate, e.g., 25, 29.97, or 30 frames/second. The successive pictures (either fields or frames), indexed by j, of the input video signal Vi, enter the compression engine 25 of the video encoder 22i at respective encode times $t_e(i,j)$. Each picture j of the input video signal Vi is instantaneously compressed and all of the compressed data which constitutes that picture j is input to the logical buffer 27 of the encoder 22i instantaneously, at time $t_e(i,j)$. As will be appreciated by those skilled in the pertinent art, the logical buffer 27 shown in FIG. 2 is not the physical buffer of the encoder 22i, which can be much larger.

The rate at which the encoded video data (i.e., compressed/coded picture data) is output from the video encoder 22i at a time t is specified as $R_i(t)$. Further, assuming that there is zero delay in the network/transmission channel 26', at time t, the demultiplexed, encoded video data enters the buffer 37 of the video decoder 33i at the same rate $R_i(t)$ that the data is output from the logical buffer 27 of the video encoder 22i. All of the compressed data which constitutes the picture j is then output from the buffer 37 of the video decoder 33i at a time $t_d(i,j)$ specified by the decode time stamp (DTS) of the picture, for decompression by the decompression engine 39.

For purposes of simplifying the model depicted in FIG. 2 for illustrating the derivation of the control signals CSi that are issued by the controller 30, the following assumptions are made: (a) in the case of an MPEG-2 system, only elementary stream data is present in the logical buffer 27 of the video encoder 22i, i.e., there is no PES Header data in this buffer; (b) $t_d(i,j)=\Delta_i$, where $\Delta_i$ is the end-to-end buffer delay and is assumed to be a constant for each encoder 22i, it being understood that the actual buffer delays are usually different for the different encoders 22i; (c) data transfer between the logical buffer 27 of the video encoder 22i and the multiplexer 24' at time t is based on the buffer transfer rate $R_i(t)$, which is assumed to be a piecewise constant function; and, (d) deviations from the illustrative model depicted in FIG. 2 are handled internally of either the encoder 22i and/or the multiplexer 24'.

Some deviations from the illustrative model depicted in FIG. 2 are that are present in existing encoder systems include the following: (a) the encoder 22i does not instantaneously insert all of the data that comprises a picture j into its logical buffer 27; (b) the data that is transferred from the logical buffer 27 of the encoder 22i to the multiplexer 24' may include packetization overhead (i.e., overhead data required by the protocol, as opposed to strictly payload data); and, (c) depending on how the encoder 22i handles the use of the repeat_first_field feature (for performing a three-two pulldown procedure on the incoming video data Vi), the end-to-end buffer delay may not be a constant. As will be readily appreciated by those skilled in the pertinent art, these and other possible deviations from the illustrative model depicted in FIG. 2 can be handled internally of the encoder 22i and/or the multiplexer 24'.

In the presently preferred embodiment of the present invention to be described in greater detail hereinbelow, the control algorithm implemented in software residing in the controller 30 is designed to ensure that: (i) the coded bitstream produced by each video encoder 22 will be compliant with the MPEG-2 T-STD and VBV models; (ii) the buffer 27 for each video encoder 22 will not underflow or overflow; (iii) the buffer 37 for each video decoder 33 will not underflow or overflow; (iv) the sum of the output rates (bit rates) of all of the encoders 22 will not be greater than the maximum allowable channel rate (i.e. the maximum bit rate of the transmission channel 26); and, (v) the perceived quality of the pictures across all channels will be equal (and optimized).

For purposes of the ensuing further detailed description of the presently preferred embodiment of the present invention (and for the appended claims), the following notations will be utilized: (i) i=1 through L, i.e., a total of L video encoders 22 are included in the multiplexed system 20; (ii) the size of the buffer 37 of a decoder 33i that is receiving the data generated by the corresponding encoder 22i is $B_{d,i}$; (iii) the size of the buffer 27 of an encoder 22i is $B_{e,i}$; (iv) the number of bits contained in the buffer 27 of an encoder 22i at time t is $E_i(t)$; (v) the number of bits contained in the buffer 37 of the decoder 33i receiving data produced by the corresponding encoder 22i is $D_i(t)$; (vi) the number of bits used in encoding the jth picture that is encoded by an encoder 22i is $b(i,j)$; (vii) the output rate (bit rate) of an encoder 22i is $R_i(t)$. This rate varies with time, but is piecewise constant; (viii) the end-to-end buffer delay of an encoder 22i and its corresponding decoder 33i is $\Delta_i$; (ix) the target number of bits allocated for encoding the next I picture to be encoded by an encoder 22i is $T_{Ii}(t)$. The target number of bits $T_{Ii}(t)$ also varies with time. Thus, if the next picture I is encoded at time τ, the target number of bits allocated for encoding the next I (I-type) picture will be $T_{Ii}(\tau)$; (x) the target number of bits allocated for encoding the next P (P-type) picture to be encoded by an encoder 22i is $T_{Pi}(t)$; (xi) the target number of bits allocated for encoding the next B (B-type) picture to be encoded by an encoder 22i is $T_{Bi}(t)$; (xii) the estimate at time t of the complexity of the next I (I-type) picture of the video sequence being encoded by an encoder 22i is $X_{Ii}(t)$. The complexity of the video sequence also varies with time.

The actual measure of complexity utilized in the practice of the present invention is not critical or limiting thereto. The only requirement is that the measure of complexity utilized be of a nature that it is meaningful to compare these measures across video sequences, in order to provide a meaningful indication of the relatively complexity of the pictures being encoded by the different encoders 22; (xiii) the estimate at time t of the complexity of the next P picture of the video sequence being encoded by an encoder 22$i$ is $X_{Pi}(t)$; (xiv) the estimate at time t of the complexity of the next B picture of the video sequence being encoded by an encoder 22$i$ is $X_{Bi}(t)$. Although the values of the three parameters $X_{Ii}(t)$, $X_{Pi}(t)$, and $X_{Bi}(t)$ can vary with time, they will typically change substantially only at scene changes in the incoming video signal; (xv) the GOP ("group of pictures") size for each encoder 22$i$ is $N_i(t)$. The value of this parameter can vary with time; (xvi) the M parameter for an encoder 22$i$ is $M_i(t)$. The value of this parameter can also vary with time; (xvii) the picture rate at time t for an encoder 22$i$ is $F_i(t)$. The picture rate of an encoder can vary with time as it transitions in and out of film-mode; and, (xviii) the maximum allowable bit rate over the the transmission channel 26 is $R_c$.

In order to maintain equal video quality among all of the encoders 22, the target number of bits for each picture is prescribed to be directly proportional to the complexity of the picture, through a proportionality parameter C(t). This constraint is defined by the following equations (1-a)–(1-c):

$$T_{Ii}(t)=C(t)\times X_{Ii}(t) \quad (1\text{-}a)$$

$$T_{Pi}(t)=C(t)\times X_{Pi}(t) \quad (1\text{-}b)$$

$$T_{Bi}(t)=C(t)\times X_{Bi}(t) \quad (1\text{-}c)$$

where C(t) is independent of i. C(t) can vary with time and depends on the content of the input video signals Vi. At time t, an estimated encode rate $E_{Ri}(t)$ for an encoder 22$i$ can be calculated in accordance with the following equation (2):

$$E_{Ri}(t)=C(t)\times[X_{Ii}(t)+(N_i(t)/M_i(t)-1)\times X_{Pi}(t)+(N_i(t)-N_i(t)/M_i(t))\times X_{Bi}(t)] \times F_i(t)/N_i(t) \quad (2)$$

A counter (not shown) is initialized to a value of $R_cZ$ (where Z is a prescribed time constant, e.g., 10 seconds) and incremented by 1 bit every 1/$R_c$ second. Starting at a time $t_e$ when any one of the L video encoders 22 begins to encode a picture, the counter is decremented by the target number of bits used to encode the picture. When the encoding of that picture is complete, the counter is adjusted for the discrepancy, if any, between the target number and actual number of bits used in encoding that picture. At time t, the value of the counter is denoted Count(t). A constraint defined by equation (3) below is imposed on $E_{Ri}(t)$:

$$\sum_{i=1}^{L} E_{Ri}(t) = \text{Count}(t)/Z \quad (3)$$

Equations (2) and (3) are used to compute a value for C(t) which is then used to compute $T_{Ii}(t)$, $T_{Pi}(t)$, and $T_{Bi}(t)$ using equation (1). The following equation (4) has be satisfied for all values of t and i, in order to prevent decoder buffer underflow and overflow:

$$E_{Ri}(t) \leq \int_{t}^{(t+\Delta_i)} R_i(u)du \leq B_{di} + E_i(t) \quad (4)$$

In the presently preferred embodiment of the present invention, the controller 30 controls the encoding parameters of each of the video encoders 22, in accordance with the control algorithm, in such a manner as to prevent buffer underflow and overflow for each of the L video encoders 22. Notably, the L encoders 22 are not required to be synchronized.

The controller 30, in accordance with the control algorithm, generates control signals CSi which are applied via respective control signal lines (e.g., a bidirectional control signal bus 50) to the control inputs C of the respective video encoders 22. These control signals CSi carry the values of the encoding parameters which are dynamically controlled by the controller 30, including the target number of bits for encoding each picture encoded by the encoders 22, the minimum and maximum number of bits for encoding each picture encoded by the encoders 22, and the bit rate (channel output rate) $R_i$ for each of the encoders 22.

In this connection, the target number of bits communicated by the controller 30 to the encoders 22 is a recommended (target) number, and not an absolute requirement. The actual number of bits used by an encoder 22$i$ to encode a picture may vary from the target number of bits specified by the controller 30 for that picture, within a range between the minimum and maximum number of bits also specified by the controller 30 for that picture. If the number of bits actually used to code the picture is within this specified range, then it is guaranteed that no underflow or overflow of the buffer 37 of the corresponding decoder 33$i$ will occur.

The buffer 27 of each encoder 22$i$ is emptied at the bit rate $R_i$ specified by the respective control signal CSi from the controller 30 until the bit rate $R_i$ is changed, at which time, it continues to be emptied, but at the new bit rate $R_i$. Preferably, the bit rates $R_i$ of all L of the encoders 22 are changed by the controller 30 simultaneously, by way of the control signals CSi.

Figure 3:
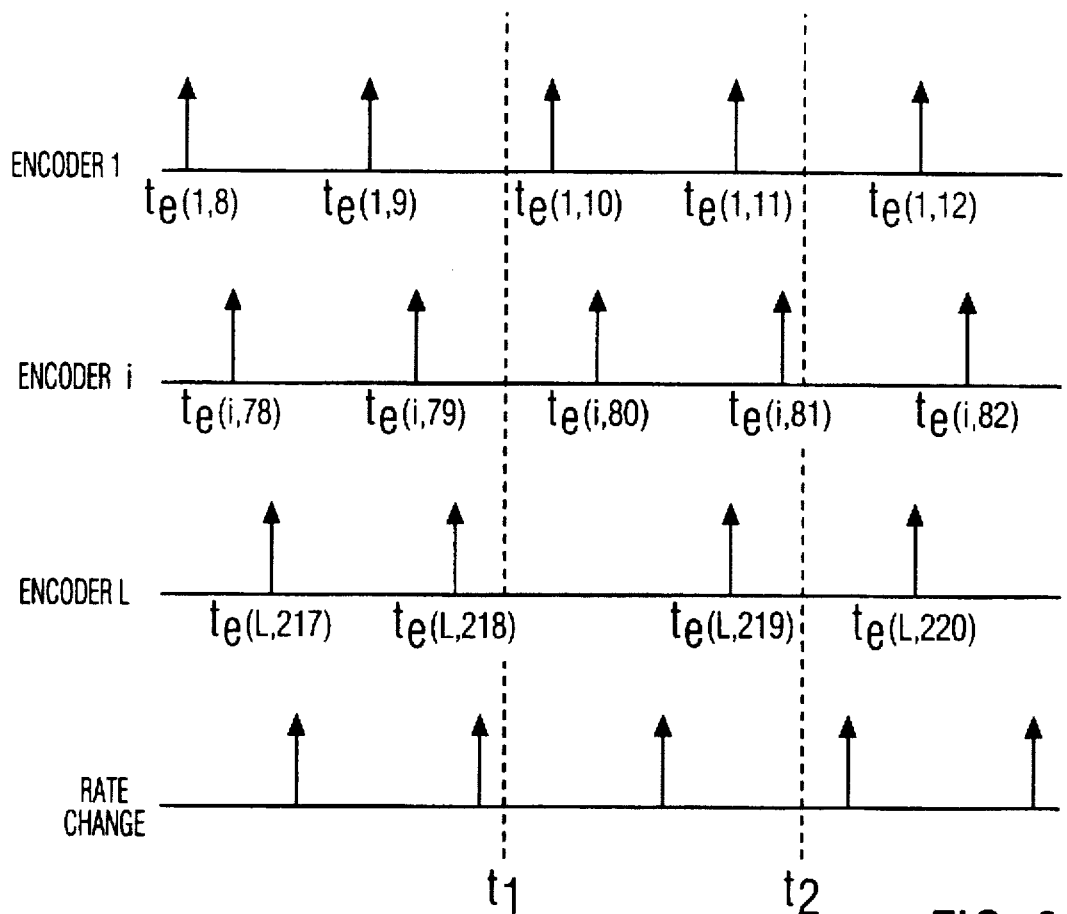
FIG. 3 is a diagram which graphically depicts the timing of rate events and coding events for different encoding channels of the multiplexer system of the presently preferred embodiment of the present invention; and, FIG. 4 is a diagram which graphically depicts the changing of the bit rate of an encoder i of the multiplexer system of the presently preferred embodiment of the present invention.

With reference now to FIG. 3, the concept of coding events and rate events will now be discussed in order to provide the necessary background for further detailed description of the present invention. In general, a coding event occurs at a time τ if any of the encoders 22$i$ encodes a picture at that instant. A rate event occurs at time τ if a change in the bit (output) rates Ri of the encoders 22$i$ is scheduled for that time.

These concepts are illustrated in FIG. 3, which shows coding events corresponding to the times $t_e(1,8)$, $t_e(1,9)$, $t_e(1,10)$, $t_e(1,11)$, and $t_e(1,12)$, at which an encoder "1" encodes pictures 8, 9, 10, 11, and 12, respectively, and the times $t_e(i,78)$, $t_e(i,79)$, $t_e(i,80)$, $t_e(i,81)$, and $t_e(i,82)$ that an encoder "i" encodes pictures 78, 79, 80, 81, and 82, respectively, and the times $t_e(L,217)$, $t_e(L,218)$, $t_e(L,219)$, and $t_e(L,220)$ that an encoder "L" encodes pictures 217, 218, 219, and 220, respectively; and, shows rate events corresponding to the times $t_1$ and $t_2$. As is true in the case of encoder "L", the encode times need not be periodic, e.g., the encode times are not periodic in the case of pictures that have undergone a reverse three-two pulldown procedure. Non-periodic encode times can also occur in the case of pictures having interspersed frame and/or field structures.

It will be readily recognized by those skilled in the pertinent art that more than one coding event can occur at the same time, and further, that one or more coding events and a rate event can occur simultaneously.

The discussion will now be directed to a further detailed description of the control algorithm employed by the controller 30 in controlling the encoding parameters of the multiple encoders 22. The first aspect of the control algorithm that will be described is the initialization procedure which is performed at the start-up time of the multiplexed system 20. The second aspect of the control algorithm that will be described is the processing which is performed in the case of a coding event. The third aspect of the control algorithm that will be described is the processing which is performed in the case of a rate event.

At system start-up time, all L of the encoders 22 are given default values $X_{Ii}(0)$, $X_{Pi}(0)$, and $X_{Bi}(0)$ for the estimates of the complexity of the next I, P, and B pictures, respectively, to be encoded thereby. The initial bit rate $R_i(0)$ for each of the encoders 22 is either given to the controller 30 and the encoders 22 by a supervisory controller (not shown) of the system 20, or are all set to the same default value, $R_i(0)=R_C/L$. Of course, the default values $X_{Ii}(0)$, $X_{Pi}(0)$, and $X_{Bi}(0)$, the channel rate $R_C$, and the number of encoders L must be provided to the controller 30, e.g., either input or preprogrammed thereinto.

When the next event is a coding event, the control algorithm must determine the target number of bits to be used by the encoder 22 which is going to encode the next picture corresponding to the coding event. In the case that the next event constitutes more than one simultaneous coding events, whereby more than one (e.g., two) of the L encoders 22 are going to encode different respective pictures (e.g., such as times $t_e(1,9)$ and $t_e(L,219)$ in FIG. 3), the control algorithm preferably first computes the target number of bits to be used by one of the encoders in encoding the next pictures contained in the video signal Vi which it is processing, and then computes the target number of bits to be used by the other one of the encoders in encoding the next pictures contained in the video signal Vi which it is processing. As will become more fully apparent hereinafter, if a rate event occurs simultaneously with a coding event, then the control algorithm preferably computes the target number of bits values for all of the encoders prior to computing the new (updated) encoder bit rates.

The following example is given to illustrate the above. Namely, assume that the next coding event is the encoding of the next picture by an encoder 22$i$ at time $\tau$. Prior to the encoding of this next picture to be encoded, the target number of bits $T_{Ii}(t)$, $T_{Pi}(t)$, or $T_{Bi}(t)$, as the case may be, for this next picture to be encoded, is communicated to the encoder 22$i$ by the controller 30, via the control signals CSi. The controller 30 calculates these values using equations (1), (2), and (3) and the current values for $X_{Ii}(t)$, $X_{Pi}(t)$, and $X_{Bi}(t)$, with the constraint that equation (4) is also satisfied. If equation (4) is not satisfied, then the target number of bits is clipped (truncated) to the closest value that will meet this constraint. In the following discussion, the constraints that are necessary for satisfying equation (4) are fully developed.

In the ensuing discussion, the encode time for the last picture encoded by an encoder 22$i$ will be denoted $t_e(i,k)$, the encode time for the next picture to be encoded will be denoted $t_e(i, k+1)$, and the encode time for the picture following that will be denoted $t_e(i,k+2)$. Since the next picture is to be encoded by encoder 22$i$ at time $\tau$, then $\tau=t_e(i,k+1)$. For purposes of the present discussion, it will be assumed that if encoder 22$i$ encodes picture $j$ at time $t_e(i,j)$, then all of the data that comprises the coded picture $j$ will be inserted into the encoder buffer at time $t_e(i,j)$.

If the number of bits used to code the picture $j$ is $b(i,j)$, then the encoder buffer status is defined as $E_i(t_e(i,j))=E_i(t_e(i,j))+b(i,j)$. During the time interval $\tau$ (where $\tau=t_e(i,k+1)$) $\le t < t_e(i,k+2)$), the encoder buffer status is dependent upon the initial buffer status at time $\tau$, the number of bits used to code the picture that is coded at time $\tau$, and the rate at which data is removed from the encoder buffer over that interval.

In the presently preferred embodiment of the present invention, the computations based on equations (5) and (6) presented below are performed at the earliest possible time so as to minimize the possibility of any events occurring between times t and $\tau$. For example, with reference to the example illustrated in FIG. 3, if $\tau$ corresponds to $t_e(1,10)$, then the computations based on equations (5) and (6) are preferably made as soon as possible after the time $t_1$, which is the last rate change event prior to the time $\tau$.

The constraints which must be satisfied are given by equation (4), and are calculated using the assumption that $R_i(t)$ is constant in the time interval under consideration, and is thus equal to $R_i(\tau)$. However, it should be clearly understood that it is not necessary that $R_i(t)$ actually remain constant over this time interval, since the controller 30, whenever it changes the bit rate $R_i(t)$ will, in accordance with the control algorithm, automatically verify that the new value chosen for the bit rate $R_i(t)$ will satisfy all constraints imposed by the control algorithm. One of these constraints is that for the time period $\tau=t_e(i,k+1)\le t<t_e(i,k+2)$, equation (4) requires that the following equation (5) be satisfied:

$$R_i(\tau) \times \Delta_i - B_{di} \le E_i(t(5)) \le R_i(\tau) \times \Delta_i \qquad (5)$$

since, $$E_i(t) = E_i(t_e^+(i,k)) + b(i,k+1) - \int_{t_e(i,k)}^{t} R_i(v)dv, \qquad (6)$$

where $b(i,k+1)$ is the number of bits used by encoder $i$ in encoding the picture that is encoded at time $t_e(i,k+1)$.

The constraints on $b(i,k+1)$ are:

$$R_i(t) \times (\Delta_i + t_e(i,k+2) - t_e(i,k+1)) + \qquad (7)$$

$$\int_{t_e(i,k)}^{t(i,k+1)} R_i(v)dv - B_{di} - E_i(t_e^+(i,k)) \le b(i,k+1)$$

and, $$b(i,k+1) \le R_i(\tau) \times \Delta_i + \int_{t_e(i,k)}^{t_e(i,k+1)} R_i(v)dv - E_i(t_e^+(i,k)), \qquad (8)$$

where $E_i(t^{+1}_e(i,k))$ is the number of bits in the buffer of encoder $i$ just after all of the data corresponding to the kth picture has been loaded thereinto.

Satisfying the constraint given by equation (7) ensures that decoder buffer overflow does not occur, and satisfying the constraint given by equation (8) ensures that decoder buffer underflow does not occur.

The prevention of encoder buffer underflow and overflow is managed in the following manner. More particularly, if the kth picture was the last picture encoded by encoder $i$, the encoder buffer status for the time interval $\tau=t_e(i,k+1)\le t<t_e(i,k+2)$ is given by the following equation (9):

$$E_i(t) = E_i(t_e^+(i,k)) + b(i,k+1) - \int_{t_e(i,k)}^{t} R_i(v)dv - R_i(\tau) \times (t-\tau). \qquad (9)$$

The above equation (9) assumes that the rate at which the encoder buffer is emptied is constant over the period under consideration. In order to avoid encoder buffer underflow, the constraint on $b(i,k+1)$ is:

$$b(i,k+1) \ge R_i(\tau) \times t_e(i,k+2) - \qquad (10)$$

-continued $$t_e(i,k+1) + \int_{t_e(i,k)}^{\tau} R_i(v)dv - E_i(t_e^+(i,k)).$$

In order to avoid encoder buffer overflow, the constraint on b(i,k+1) is:

$$b(i,k+1) \leq \int_{t_e(i,k)}^{\tau} R_i(v)dv + B_{e,i} - E_i(t_e^+(i,k)). \tag{11}$$

If the target number of bits $T_{Ii}(t)$, $T_{Pi}(t)$, or $T_{Bi}(t)$ computed using equations (1)–(3) does not satisfy the constraints given by equations (7) and (8), then the value closest to the target value that does satisfy the constraints given by equations (7) and (8) is chosen. This value will be either the upper limit given by equation (8) or the lower limit given by equation (7). The upper limit given by equation (8) constitutes the maximum value for $T_{Ii}(t)$, $T_{Pi}(t)$, or $T_{Bi}(t)$, and the lower limit given by equation (7) constitutes the minimum value for $T_{Ii}(t)$, $T_{Pi}(t)$, or $T_{Bi}(t)$, thereby establishing a range of actual number of bits used to encode a given picture. As previously indicated, the control signals CSi issued by the controller 30 carry the values of the encoding parameters which are dynamically controlled by the controller 30, including the minimum and maximum number of bits for encoding each picture encoded by the encoders 22. Thus, this information is communicated to the encoders 22 by the controller 30.

Further, the constraints given by equations (10) and (11) must be satisfied in order to ensure that no encoder buffer underflow or overflow occurs. These computations can advantageously be performed by the encoders 22 themselves, although this is not limiting to the present invention. Optionally, the encoder buffers can be allowed to underflow, since it is possible to dynamically reallocate the thusly freed-up bandwidth to one or more other encoders. However, this is possible only if the next scheduled bit rate change occurs prior to the point in time when underflow is likely. Thus, if the next scheduled bit rate change is at time $/\tau$ and $/\tau < t_e(i,k+2)$, then equation (10) can be solved by substituting $/\tau$ for $t_e(i,k+2)$.

As previously discussed, starting at a time $t_e i$ when any one of the L video encoders 22 encode a picture, the counter is decremented by the target number of bits used to encode the picture. When the encoding of that picture is complete, the counter is adjusted for the discrepancy, if any, between the target number and actual number of bits used in encoding that picture. More specifically, Count(t) is then adjusted for any discrepancy between the target number and actual number of bits used in encoding that picture. In this connection, each of the encoders 22 communicate the actual number of bits which they utilize in encoding each picture to the controller 30, e.g., via the bidirectional bus 50. Further, each of the encoders 22 also communicates to the controller 30 the estimate of the complexity $X_{Ii}(t)$, $X_{Pi}(t)$, or $X_{Bi}(t)$ of each picture and the picture type (I, P, or B) as soon as it is able to determine the same, e.g., via the bidirectional bus 50. This information is then used by the controller 30 in updating the solutions to the equations (1) and (2). In general, each of the encoders is programmed to communicate at least the following information to the controller 30, in accordance with the control algorithm used in the presently preferred embodiment of the present invention:

a) the value of $D_i(t)$;
b) the encode times $t_{e,i}$ for the next two pictures to be encoded;
c) the frame rate;
d) the actual number of bits used to encode the last picture;
e) the estimate of complexity $X_{Ii}(t)$, $X_{Pi}(t)$, or $X_{Bi}(t)$ for the last picture;
f) the current value of $N_i(t)$; and,
g) the current value of $M_i(t)$.

The bit rate $R_i(t)$ at which each encoder buffer is emptied is adjusted periodically, with all encoder bit rates $R_i(t)$ being adjusted simultaneously. The bit rate adjustment period is preferably every 1/F seconds, where F is the maximum frame rate of the input video Vi to any one of the L encoders 22. Prior to making a bit rate adjustment, the below-described procedures and computations are made by the controller 30 in accordance with the control algorithm of the presently preferred embodiment of the present invention.

Figure 4:
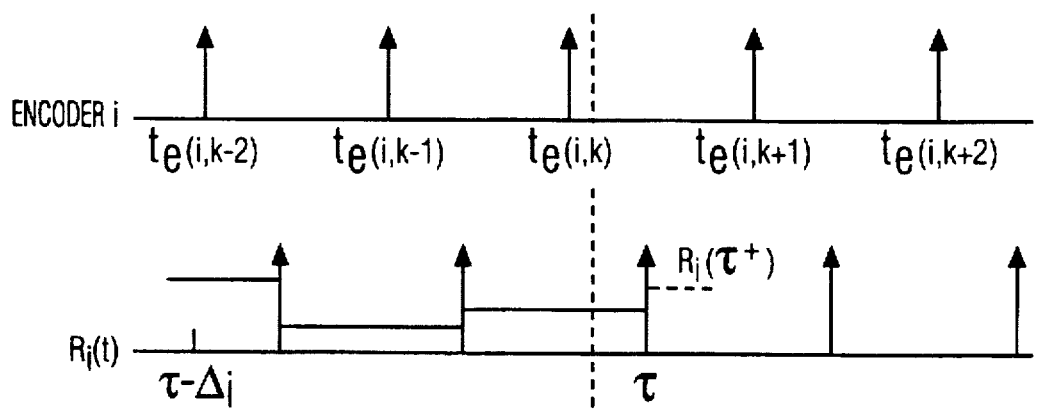

More particularly, each one of the L encoders 22 communicates to the controller 30 its buffer status $E_i(t)$ upon completing the encoding of each picture. The controller 30 stores this buffer status information for each ith one of the encoders 22 ("encoder i") for a period of $\Delta_i$ seconds. FIG. 4 illustrates the change of the output or bit rate $R_i(t)$ of the encoder i. The dotted vertical line denotes a time instance when the next event is a (bit change) rate event, and $\tau$ is the time that the rate event is scheduled to occur. As is shown in FIG. 4, the bit rate $R_i(t)$ of the encoder i is changed by the controller 30 to $R_i(\tau^+)$ at the rate change time $\tau$. FIG. 4 also depicts a number of prior bit rate changes for the encoder i, where the kth picture was the last picture encoded by the encoder i prior to the illustrated rate event, and the k+1st picture is the next picture to be encoded by the encoder i after the bit rate change is effected.

In order to ensure that the lower inequality of equation (4) is satisfied, the constraint represented by the following equation (12) must be satisfied:

$$E_i(t) \leq \int_t^{(t+\Delta_i)} R_i(v)dv \quad \forall t \text{ where } \tau - \Delta_i \leq t \leq \tau. \tag{12}$$

Let t be such that $t_e(i,j) \leq t < t_e(i,j+1)$. If t is within the range given in equation (12), then for the example depicted in FIG. 4, j would take values from (k-3) to k. The encoder buffer status is given by the following equation (13):

$$E_i(t) = E_i(t_e^+(i,j)) - \int_{t_e(i,j)}^{t} R_i(v)dv. \tag{13}$$

In order to ensure that decoder buffer underflow does not occur, a constraint is imposed that the new (updated) rate $R_i(\tau)$ satisfy the following equation (14):

$$R_i(\tau^+) \geq \text{Max} \left[ E_i(t_e^+(i,j)) - \int_{t_e(i,j)}^{\tau} R_i(v)dv/t_e(i,j) + \Delta_i - \tau \right] \tag{14}$$

where the maximization is done over all values of j where j is such that $\tau - \Delta_i < t_e(i,j) \leq \tau$. In the example illustrated in FIG. 4, these values of j would be (k-2), (k-1), and k. Note that if the numerator of the expression of equation (14) is negative, the rest of the expression need not be computed. Also, if the numerator is negative for certain values of j, those values of j need not be considered when this expression is computed in the future for further rate changes. If the numerator is negative for a certain value of $\tau$ and j, it will be negative for that value of j and all greater values of $\tau$. The constraint given by equation (14) provides a lower bound on the new (adjusted) bit rate for encoder i. If the bit rate is any lower than this lower bound, there is a risk of decoder buffer underflow.

In order to ensure that decoder buffer overflow does not occur, a constraint is imposed that the following equations (15) and (16) are satisfied:

$$\int_{t}^{(t+\Delta_i)} R_i(v)dv \leq B_{d,i}(t) + E_i(t) \quad \forall t \quad \text{where } \tau - \Delta_i \leq t \leq \tau \quad (15)$$

$$R_i(\tau^+) \geq \text{Min}\left[ E_i(t_e^+(i,j)) + \right. \quad (16)$$

$$\left. B_{d,i} - \int_{t_e(i,j)}^{\tau} R_i(v)dv/t_e(i,j+1) + \Delta_i - \tau \right].$$

where the minimization function is applied over all values of j where j is such that both of the following conditions are satisfied: (1) $t_e(i,j) \leq \tau$, and (2) $t_e(i,j) > \tau - \Delta_i$. In the example illustrated in FIG. 4, this would correspond to values of j that range from (k-3) to k.

Thus, in determining the new (adjusted) bit rate $R_i(\tau^+)$ for encoder i, satisfying the constraints given by equations (14) and (16) will ensure that no decoder buffer underflow or overflow will occur.

The encoder buffer state from time $\tau$ (the time of the next scheduled bit rate change) to time /t is given by the following equation (17):

$$E_i(t) = E_i(t_e^+(i,j)) + \sum_{j=1}^{\infty} [b(i,k+j) \times u(t - t_e(i,k+j))] - \quad (17)$$

$$\int_{t_e(i,k)}^{\tau} R_i(v)dv - R_i(\tau^+) \times (t-\tau)),$$

where u(t) is the step function with value 1 when $t \geq 0$ and value 0 when t<0.

In order to ensure that encoder buffer overflow does not occur, a constraint is imposed that the following equation (18) is satisfied:

$$R_i(\tau^+) \leq \text{Min}\left[ E_i(t_e^+(i,k)) + \sum_{j=1}^{n} b(i,k+j) - \right. \quad (18)$$

$$\left. \int_{t_e(i,k)}^{\tau} R_i(v)dv/t_e(i,k+n+1) - \tau \right],$$

where the minimization is done over all values of n where $n \geq 0$, and $t_e(i,k+n) \leq \tau$. If $t_e(i,k+n+1) \geq \tau$, then $t_e(i,k+n+1)$ in equation (18) is replaced by /t. If equation (18) is satisfied, it is ensured that no encoder buffer underflow will occur prior to time /t. The possibility of encoder buffer underflow occurring after time /t can be handled at time /t by changing the bit rate in such a manner as to prevent encoder buffer underflow.

Equation (17) can be used to derive the following equation (19) which is imposed as a constraint in order to avoid encoder buffer overflow:

$$R_i(\tau^+) \geq \text{Max}\left[ E_i(t_e^+(i,k)) + \sum_{j=1}^{n} b(i,k+j) - \right. \quad (19)$$

$$\left. \int_{t_e(i,k)}^{\tau} R_i(v)dv - B_{e,i}/t_e(i,k+n) - \tau \right],$$

where the maximization is done over all values of n such that n is a positive integer and $t_e(i,k+n) \leq \tau$. If equation (19) is satisfied, it is ensured that encoder buffer overflow will not occur prior to time /t. The possibility of encoder buffer underflow occurring after time /t can be handled at time /t by changing the bit rate in such a manner as to prevent encoder buffer overflow.

The encoder bit (output) rates $R_i(t)$ are computed by the controller 30 in accordance with the following algorithm. Namely, equation (14) is used to calculate the minimum bit rate $R_{min,d}(i)$ required for each encoder 22 in order to prevent decoder buffer underflow. Equation (16) is used to calculate the maximum bit rate $R_{max,d}(i)$ for each encoder 22 required in order to avoid decoder buffer overflow. Equation (18) is used to calculate the maximum bit rate $R_{max,e}(i)$ for each encoder 22 required in order to prevent encoder buffer underflow. Equation (19) is used to calculate the minimum bit rate $R_{min,e}(i)$ for each encoder 22 required in order to prevent encoder buffer overflow.

In accordance with the presently preferred embodiment of the present invention, the control algorithm employed by the controller 30 maintains all of the encoder buffers 22 as empty as possible in order to provide increased flexibility to the rate allocation procedure, and to optimize the same.

The problem of maintaining the encoder buffers 22 as empty as possible can be stated in the following manner.

Namely, determine $R_i(\tau^+)$ for i=1 to L, such that (20-a) $R_i(\tau^+) \geq R_{min,d}(i)$, (20-b) $R_i(\tau^+) \geq R_{min,e}(i)$, (20-c) $R_i(\tau^+) \leq R_{max,d}(i)$, (20-d) $R_i(\tau^+) \leq R_{max,e}(i)$, and (20-e) minimize $\text{Max}[E_i(/\tau)]$.

The following algorithm provides the optimal solution to this problem.

Step 1

Define $R_{delta}(i) = R_{max,e}(i) - R_i(\tau^+)$

Define $R_{left} = R_c - \sum_{i=1}^{L} R_i(\tau^+)$

Perform the following computations:

$R_{min}(i) = \text{Min}[R_{min,e}(i), R_{min,d}(i)]$ $R_{max}(i) = \text{Min}[R_{max,e}(i), R_{max,d}(i)]$ $R_{max} = \sum_{i=1}^{L} R_{max,e}(i)$ Initialize $R_i(\tau^+) = R_{max,e}(i) - R_{max} - R_c/L$. Compute $R_{delta}(i)$.

Step 2

Perform each of the following operations for all values of i: If $R_i(\tau^+) < R_{min}(i)$, then set $R_i(\tau^+) = R_{min}(i)$. If $R_i(\tau^+) > R_{max}(i)$, then set $R_i(\tau^+) = R_{max}(i)$. Compute $R_{delta}(i)$. Compute $R_{left}$.

Step 3

If $R_{left} = 0$, then optimality has been achieved. Terminate procedure. If $R_{left} < 0$, then, among those encoders 22 in which $R_i(\tau^+) > R_{min}(i)$, select the one(s) with the lowest $R_{delta}(i)$. This set of encoders is denoted C. Next, decrease the $R_i(\tau^+)$ and update $R_{delta}(i)$ and $R_{left}$ of all of the encoders in set C by the same amount until one of the following is true: (a) there are other encoders that have the same $R_{delta}(i)$ as the encoders in set C; or, (b) $R_i(\tau^+) = R_{min}(i)$ for one of the encoders in C; or, (c) $R_{left} = 0$.
Repeat Step 3.

If $R_{left} > 0$, then, among those encoders 22 in which $R_i(\tau^+) > R_{max}(i)$, select the one(s) with the lowest $R_{delta}(i)$. This set of encoders is denoted C. Next, decrease the $R_i(\tau^+)$ and update $R_{delta}(i)$ and $R_{left}$ of all of the encoders in set C by the same amount until one of the following is true: (a) there are other encoders that have the same $R_{delta}(i)$ as the encoders in set C; or, (b) $R_i(\tau^+)=R_{max}(i)$ for one of the encoders in C; or, (C) $R_{left}=0$.

Repeat Step 3.

Although the present invention has been described in detail hereinabove, it should be clearly understood that many variations and/or modifications of the basic inventive concepts taught herein which may appear to those skilled in the pertinent art will still fall within the spirit and scope of the present invention, as defined in the appended claims.

What is claimed is:

1. A multiplexed data transmission system, including:
   a plurality of encoders each having a data input coupled to a respective one of a plurality of data signals, a control input, and an encoder output;
   a multiplexer having a plurality of multiplexer inputs coupled to respective ones of said encoder outputs, and a multiplexer output coupled to a transmitting end of a data transmission channel; and,
   a controller for producing control signals in accordance with a control algorithm, said control signals being coupled to said control input of respective ones of said encoders for dynamically controlling at least two encoding parameters of said encoders, a first one of said encoding parameters being an output bit rate of each of said encoders.

2. The system as set forth in claim 1, wherein said multiplexer multiplexes said encoder outputs and outputs a single, multiplexed encoded data stream over said data transmission channel at a transmission channel bit rate which is less than or equal to a prescribed maximum transmission channel bit rate.

3. The system as set forth in claim 2, wherein a second one of said encoding parameters comprises a target number of bits used by each of said encoders to encode each of a plurality of prescribed blocks of data contained in respective ones of said data signals.

4. The system as set forth in claim 3, wherein said transmission channel bit rate is equal to the sum of said output bit rates of all of said encoders.

5. The system as set forth in claim 4, wherein said control algorithm ensures that the quality of encoded data represented by all of said encoder outputs is substantially equalized without violating a data encoding and transmission protocol utilized by the system.

6. The system as set forth in claim 5, further comprising a plurality of encoder buffers associated with respective ones of said encoders, wherein said control algorithm imposes no constraints on the allowable size of said encoder buffers.

7. The system as set forth in claim 6, wherein said control algorithm imposes no constraints on the allowable size of decoder buffers used in a receiving station coupled to a receiving end of said data transmission channel.

8. The system as set forth in claim 7, wherein said control algorithm imposes no constraints on the allowable relative sizes of said encoder buffers and said decoder buffers.

9. The system as set forth in claim 8, wherein said control algorithm minimizes the number of bits contained by each of said encoder buffers.

10. The system as set forth in claim 6, wherein said data signals comprise video signals, and said prescribed blocks of data comprise successive pictures contained in respective ones of said video signals.

11. The system as set forth in claim 10, wherein said data encoding and transmission protocol comprises an MPEG protocol.

12. The system as set forth in claim 7, wherein said control algorithm ensures that no underflow or overflow of either said encoder buffers or said decoder buffers occurs, even in the event that a failure mode occurs in which said controller is unable to dynamically control said output bit rate of each of said encoders.

13. The system as set forth in claim 6, wherein said control algorithm imposes a constraint that no underflow or overflow of said encoder buffers can occur.

14. The system as set forth in claim 13, wherein said control algorithm imposes a further constraint that no underflow or overflow of decoder buffers used in a receiving station coupled to a receiving end of said data transmission channel can occur.

15. The system as set forth in claim 14, wherein said data signals comprise video signals, and said prescribed blocks of data comprise successive pictures contained in respective ones of said video signals.

16. The system as set forth in claim 15, wherein said target number of bits are allocated by said controller in accordance with said control algorithm in such a manner that all of said encoders are allocated a target number of bits functionally related to a measure of complexity of a picture currently being encoded thereby.

17. The system as set forth in claim 15, wherein said control algorithm imposes an additional constraint that an actual number of bits used by each of said encoders in encoding each of said pictures not be greater than a dynamically allocated maximum number of bits and not be less than a dynamically allocated minimum number of bits.

18. The system as set forth in claim 17, wherein said controller dynamically varies said output bit rate of each of said encoders simultaneously at prescribed bit rate change intervals, in accordance with said control algorithm.

19. The system as set forth in claim 18, wherein said controller dynamically varies said target number of bits used by each of said encoders on a picture-by-picture basis, in accordance with said control algorithm.

20. The system as set forth in claim 19, wherein each of said encoders communicates to said controller the actual number of bits used thereby in encoding each picture encoded thereby.

21. The system as set forth in claim 20, wherein each of said encoders communicates to said controller a measure of complexity of each picture encoded thereby.

22. The system as set forth in claim 17, wherein said controller dynamically varies said output bit rate of each of said encoders simultaneously every 1/F seconds, in accordance with said control algorithm, where F is a maximum frame rate of any of said video signals.

23. The system as set forth in claim 17, wherein said control algorithm includes the following equations:

$$T_{Ii}(t)=C(t)\times X_{Ii}(t);\ T_{Pi}(t)=C(t)\times X_{Pi}(t);\ \text{and},\ T_{Bi}(t)=C(t)\times X_{Bi}(t).$$

24. The system as set forth in claim 23, wherein said control algorithm further includes the following equations:

$$E_{Ri}(t)=C(t)\times[X_{Ii}(t)+(N_i(t)/M_i(t)-1)\times X_{Pi}(t)+(N_i(t)-N_i(t)/M_i(t))\times X_{Bi}(t)]\times F_i(t)/N_i(t);\ \text{and},$$

$$\sum_{i=1}^{L} E_{Ri}(t) = \text{Count}\ (t)/Z.$$

25. The system as set forth in claim 24, wherein said control algorithm further includes the following equation:

$$E_{Ri}(t) \leq \int_{t}^{(t+\Delta_i)} R_i(u)du \leq B_{di} + E_i(t).$$

26. The system as set forth in claim 25, wherein said control algorithm further includes the following equations:

$$R_i(\tau) \times \Delta_i - B_{di} \leq E_i(t) \leq R_i(\tau) \times \Delta_i;$$

$$E_i(t) = E_i(t_e^+(i,k)) + b(i,k+1) - \int_{t_e(i,k)}^{t} R_i(v)dv;$$

$$R_i(t) \times (\Delta_i + t_e(i,k+2) - t_e(i,k+1)) +$$

$$\int_{t_e(i,k)}^{t(i,k+1)} R_i(v)dv - B_{di} - E_i(t_e^+(i,k)) \leq b(i,k+1);$$

$$b(i,k+1) \leq R_i(\tau) \times \Delta_i + \int_{t_e(i,k)}^{t_e(i,k+1)} R_i(v)dv - E_i(t_e^+(i,k));$$

$$E_i(t) = E_i(t_e^+(i,k)) + b(i,k+1) - \int_{t_e(i,k)}^{t} R_i(v)dv - R_i(\tau) \times (t-\tau);$$

$$b(i,k+1) \geq R_i(\tau) \times t_e(i,k+2) -$$

$$t_e(i,k+1) + \int_{t_e(i,k)}^{\tau} R_i(v)dv - E_i(t_e^+(i,k));$$

$$b(i,k+1) \leq \int_{t_e(i,k)}^{\tau} R_i(v)dv + B_{e,i} - E_i(t_e^+(i,k));$$

$$E_i(t) \leq \int_{t}^{(t+\Delta_i)} R_i(v)dv \quad \forall t$$

where $\tau - \Delta_i \leq t \leq \tau$; and, $$E_i(t) = E_i(t_e^+(i,j)) - \int_{t_e(i,j)}^{t} R_i(v)dv.$$

27. The system as set forth in claim 26, wherein said control algorithm further includes the following equations:

$$R_i(\tau^+) \geq \text{Max}\left[ E_i(t_e^+(i,j)) - \int_{t_e(i,j)}^{\tau} R_i(v)dv/t_e(i,j) + \Delta_i - \tau \right];$$

$$\int_{t}^{(t+\Delta_i)} R_i(v)dv \leq B_{d,i}(t) + E_i(t) \quad \forall t \text{ where } \tau - \Delta_i \leq t \leq \tau;$$

$$R_i(\tau^+) \geq \text{Min}\left[E_i(t_e^+(i,j))\right] + B_{d,i} -$$

$$\int_{t_e(i,j)}^{\tau} R_i(v)dv/t_e(i,j+1) + \Delta_i - \tau \Bigg];$$

$$E_i(t) = E_i(t_e^+(i,j)) + \sum_{j=1}^{\infty} [b(i,k+j) \times u(t - t_e(i,k+j))] -$$

$$\int_{t_e(i,k)}^{\tau} R_i(v)dv - R_i(\tau^+) \times (t-\tau);$$

$$R_i(\tau^+) \leq \text{Min}\left[ E_i(t_e^+(i,k)) + \sum_{j=1}^{n} b(i,k+j) - \int_{t_e(i,k)}^{\tau} R_i(v)dv/t_e(i,k+n+1) - \tau \right]; \text{ and,}$$

$$R_i(\tau^+) \geq \text{Max}\left[ E_i(t_e^+(i,k)) + \sum_{j=1}^{n} b(i,k+j) - \int_{t_e(i,k)}^{\tau} R_i(v)dv - B_{e,i}/t_e(i,k+n) - \tau \right].$$

28. A method for dynamically controlling a multiplexed data transmission system which includes a plurality of encoders each having a data input coupled to a respective one of a plurality of data signals and each producing a respective encoded data output, the method including the steps of:

multiplexing the respective encoded data outputs from all of the encoders to produce a single, multiplexed encoded data stream;

coupling said multiplexed encoded data stream to a transmitting end of a data transmission channel; and, dynamically controlling at least two encoding parameters of the encoders, a first one of said encoding parameters being an output bit rate of each of the encoders.

29. The method as set forth in claim 28, further comprising the step of outputting said multiplexed encoded data stream over said data transmission channel at a transmission channel bit rate which is less than or equal to a prescribed maximum transmission channel bit rate.

30. The method as set forth in claim 29, wherein a second one of said encoding parameters comprises a target number of bits used by each of the encoders to encode each of a plurality of prescribed blocks of data contained in respective ones of the data signals.

31. The method as set forth in claim 30, wherein the dynamically controlling step is carried out in accordance with a control algorithm which ensures that the quality of encoded data represented by all of the encoder outputs is substantially equalized without violating a data encoding and transmission protocol utilized by the system.

32. The method as set forth in claim 31, wherein:
the system further includes a plurality of encoder buffers associated with respective ones of the encoders; and,
said control algorithm imposes no constraints on the allowable size of said encoder buffers.

33. The method as set forth in claim 32, wherein said control algorithm imposes no constraints on the allowable size of decoder buffers used in a receiving station coupled to a receiving end of said data transmission channel.

34. The method as set forth in claim 33, wherein said data signals comprise video signals, and said prescribed blocks of data comprise successive pictures contained in respective ones of said video signals.

35. The method as set forth in claim 34, wherein said data encoding and transmission protocol comprises an MPEG protocol.

36. The method as set forth in claim 33, wherein said control algorithm imposes a constraint that no underflow or overflow of either said encoder or decoder buffers can occur.

37. The method as set forth in claim 34, wherein said target number of bits are dynamically allocated in accordance with said control algorithm in such a manner that all of the encoders are allocated a target number of bits proportional to a measure of complexity of a picture currently being encoded thereby.

38. The method as set forth in claim 37, wherein said control algorithm imposes a constraint that an actual number of bits used by each of the encoders in encoding each of said pictures not be greater than a dynamically allocated maximum number of bits and not be less than a dynamically allocated minimum number of bits.

39. The method as set forth in claim 38, wherein the dynamically controlling step includes the further sub-step of dynamically varying said output bit rate of each of the encoders simultaneously at prescribed bit rate change intervals, in accordance with said control algorithm.

40. The method as set forth in claim 39, wherein wherein the dynamically controlling step includes the sub-step of dynamically varying said target number of bits used by each of the encoders on a picture-by-picture basis, in accordance with said control algorithm.

41. The method as set forth in claim 33, wherein said control algorithm imposes a constraint that no underflow or overflow of either said encoder or decoder buffers can occur, even in the event that a failure mode occurs in which said output bit rate of each of said encoders can not be dynamically controlled.

* * * * *